Oct. 12, 1965        J. FRASER         3,211,180
                    MIXING VALVE
Original Filed Oct. 5, 1960                    3 Sheets-Sheet 1
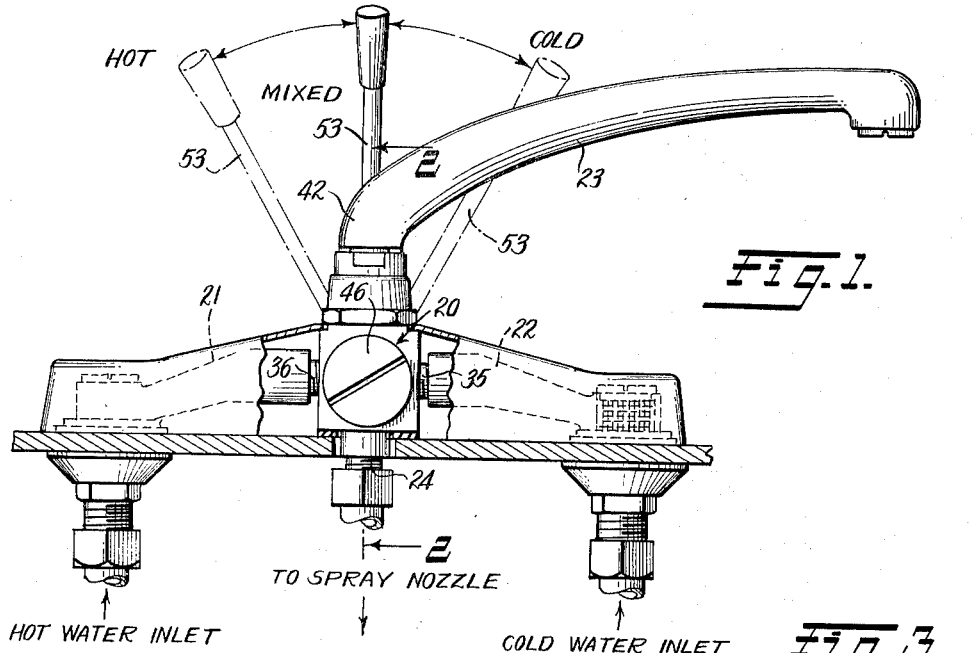
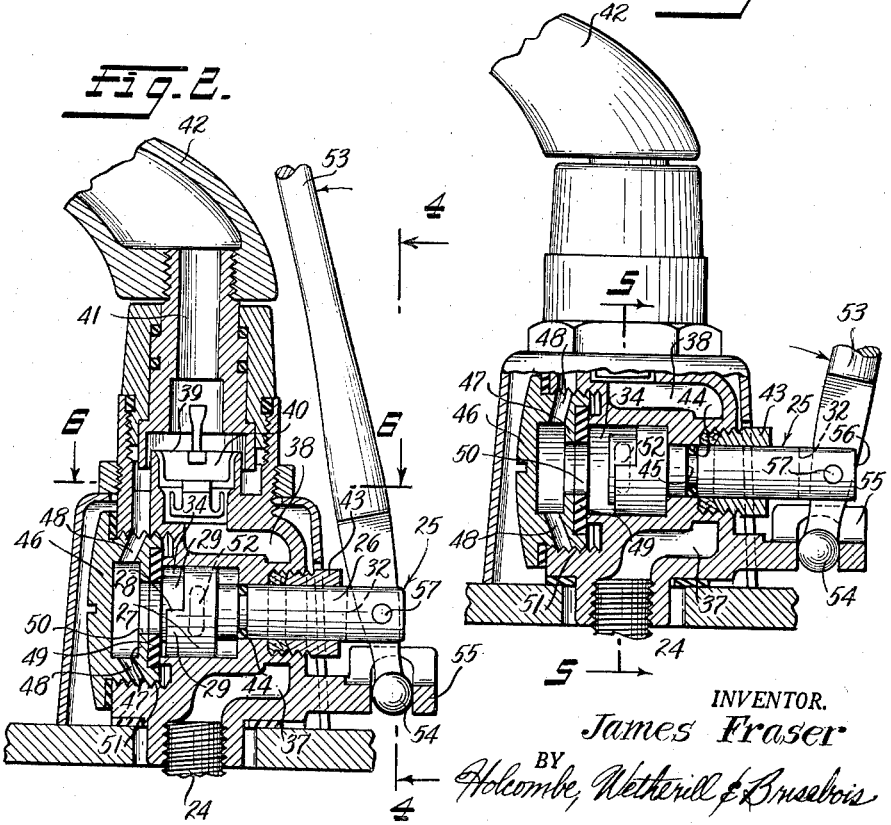
INVENTOR.
James Fraser
BY
Holcombe, Wetherill & Brisebois
ATTORNEYS Oct. 12, 1965        J. FRASER            3,211,180
                    MIXING VALVE Original Filed Oct. 5, 1960                 3 Sheets-Sheet 2

INVENTOR.
James Fraser
BY
Holcombe Wetherill & Brisebois
ATTORNEYS

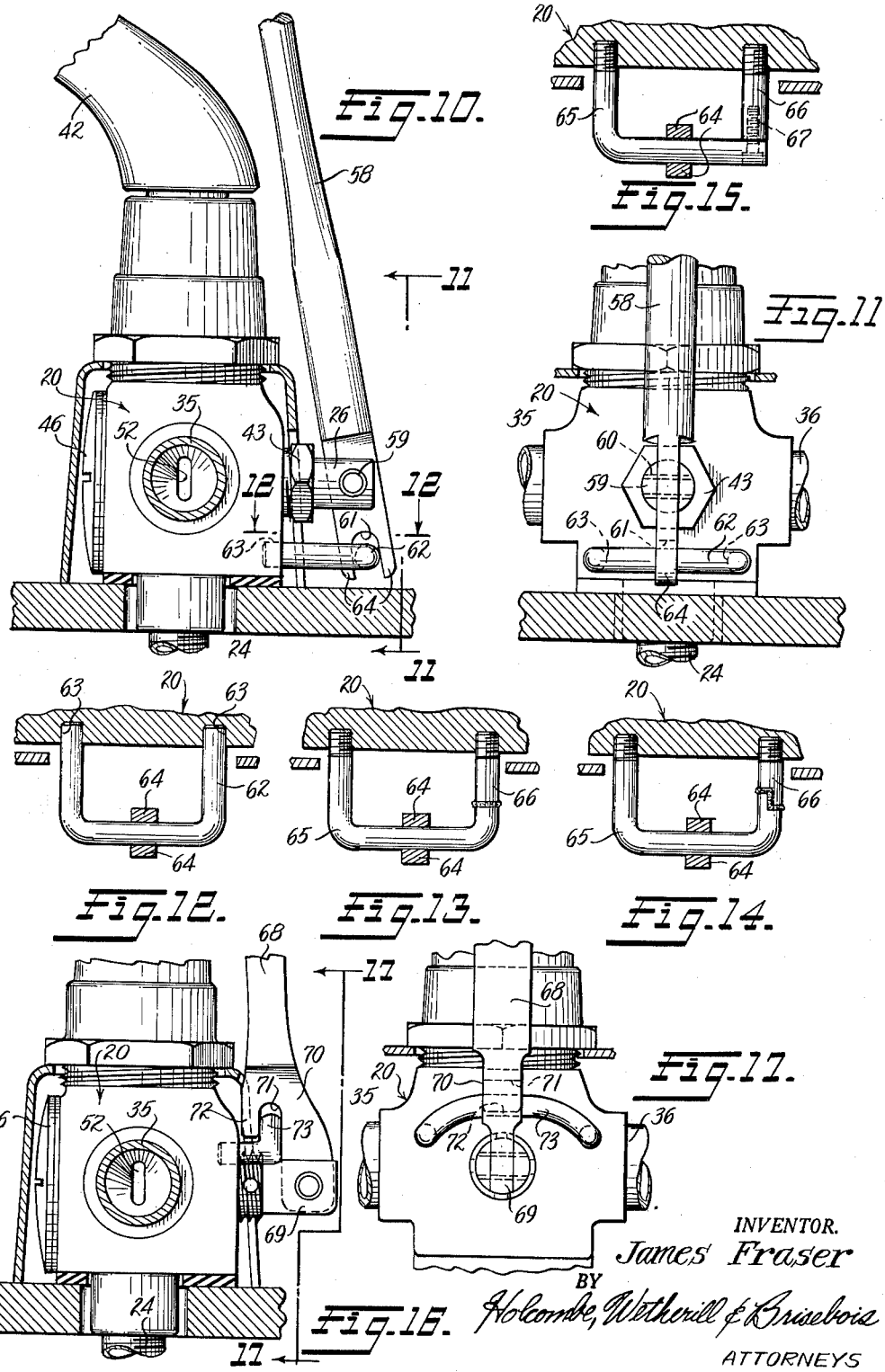

United States Patent Office 3,211,180
Patented Oct. 12, 1965

3,211,180
MIXING VALVE
James Fraser, Wilmington, Del., assignor to
Speakman Company
Original application Oct. 5, 1960, Ser. No. 60,665.
Divided and this application May 31, 1963, Ser. No.
286,105
1 Claim. (Cl. 137—625.17)

This is a division of application Serial No. 60,665, filed October 5, 1960, and now abandoned.

This invention relates to a valve structure and controlling or adjusting means therefor, and it has reference more particularly to hot and cold water mixing valves suitable for use in faucets equipped with a single means by which both a flow and mixture of hot and cold water can be placed under easy control.

It is an object of this invention to provide a faucet wherein the mixing of the hot and cold water and the volume of the water so mixed is controlled by a single means.

It is another object of this invention to provide a mixing faucet having a solid valve spindle therein.

The various features of novelty which characterize the invention are pointed out with particularity in the claims annexed to and forming part of this specification. For a better understanding of the invention, however, its advantages and specific objects obtained with its use, reference is made to the accompanying drawings and descriptive matter in which is illustrated and described a preferred embodiment of the invention.

The drawings illustrate a manually controlled single lever operated deck sink faucet, wherein:

FIG. 1 is a fragmentary front elevation of the single handle deck sink faucet of the present invention.

FIG. 2 is an enlarged fragmentary sectional view on line 2—2 of FIG. 1 showing the handle and piston in closed position.

FIG. 3 is an enlarged fragmentary vertical sectional view similar to FIG. 2 but showing the handle and piston in open position.

FIG. 10 is a fragmentary side elevation illustrating an alternate form of mounting the plunger-actuating lever.

FIG. 11 is a fragmentary rear elevation on the line 11—11 of FIG. 10.

FIG. 12 is a fragmentary horizontal sectional view on the line 12—12 of FIG. 10; and FIGS. 13 thru 15 are views similar to FIG. 12 illustrating other methods of assembling the pivot rail for the plunger actuating lever.

FIG. 16 is a fragmentary side elevation illustrating another form of mounting the plunger-actuating lever.

FIG. 17 is a fragmentary rear elevation on the line 17—17 of FIGURE 16.

Figure 4:
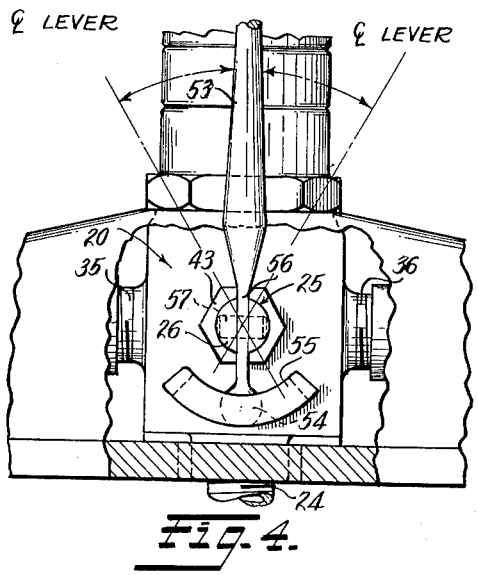
FIG. 4 is a rear elevational view looking in the direction of the arrow 4—4 of FIG. 2.

The deck sink fixture shown in the drawings comprises a chambered valve housing or body 20. Connected with this valve body is the hot water inlet conduit 21, and a cold water conduit 22, shown in FIG. 1. Also connected with the valve body is the faucet nozzle 23 and the conduit 24 leading to the spray nozzle (not shown).

Figure 5:
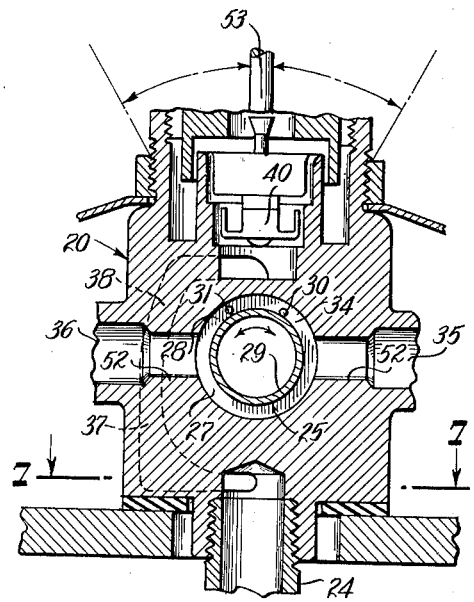
FIG. 5 is an enlarged vertical sectional view on line 5—5 of FIG. 3.
Figure 6:
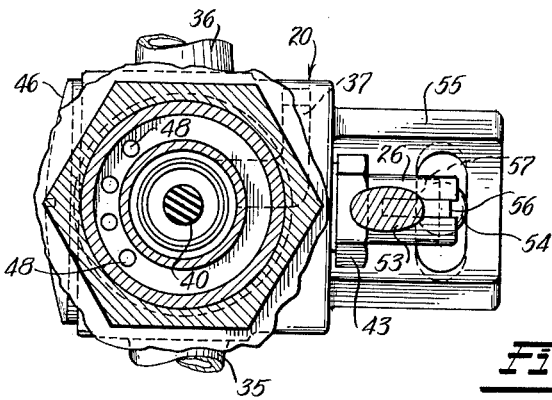
FIG. 6 is an enlarged horizontal sectional view on line 6—6 of FIG. 2.
Figure 7:
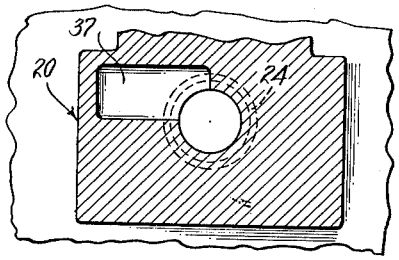
FIG. 7 is a horizontal sectional view on line 7—7 of FIG. 5.
Figure 9:
FIG. 9 is an enlarged perspective view of the piston of the present invention.

Within the valve body 20 is a piston 25 shown mounted in the body, in FIGS. 2 and 3, and in detail, in FIG. 9. This piston comprises a shaft member 26 having a boss 27 larger than the shaft member, mounted near one end thereof. This boss has a cut-away portion 28 in the upper periphery thereof and has a raised lip portion 29 on the face thereof. Two bleed holes 30, 31 are cut through the boss to connect the back thereof with the front cut-away portion 28. At the end of the shaft remote from the boss is an operating slot 32. The sides adjacent to this slot have a hole 33 cut therethrough to receive a pin which will later be described. The valve body 20 has a horizontal piston chamber 34, shown in FIG. 5. Lateral inlet chambers 35, 36 are connected with the cold and hot water conduits 22, 21, shown in FIG. 1. A discharge chamber 37, shown in FIG. 2, has a conduit 24 connected to the bottom thereof which conduit is connected to the spray nozzle (not shown). The discharge chamber 37 has a conduit 38 connected to the top thereof, which conduit leads into the chamber 39 having a conventional diverter valve 40 mounted therein. Above the chamber 39 is a conduit 41 connected to the faucet housing 42.

Figure 8:
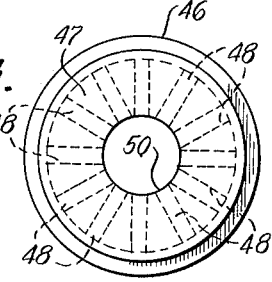
FIG. 8 is an enlarged inside face view of the removable washer plug with parts broken away for clarity.

The piston 25 is mounted within the piston chamber 34, as shown in FIG. 3, and is subject to both reciprocal motion and rotary motion. This piston is held in water-tight engagement with the valve body by the usual packing gland 43 and has an O-ring 44 cut into the groove 45 in the side of the piston shaft. Closing the front of the valve body is a cap member 46, shown in detail in FIG. 8. This cap member has an inner plate 47 mounted thereon. This plate has an openings 48, 48 around the sides thereof and has a recessed surface that holds a resilient washer 49, as shown in FIGS. 2 and 3. This plate has a central opening 50 therein and is retained across the front of the valve body by means of screw threads 51.

The piston, when in the closed position, shown in FIG. 2 has its lip portion 29 in water-tight contact with the rubber washer 49 in the plate, and prevents any water from escaping through the opening 50 therein. The boss portion 27 of the piston overlies the hot and cold water inlet ports 52, 52 in the side of the valve body which connect with the inlet chambers 35 and 36. These ports 52, 52 are shown in FIGS. 2 and 3.

The operating means for this piston comprises a lever 53 having a ball 54 at the lower end thereof. This ball is received in and held by a ball receiving race 55 rigidly mounted on the rear portion of the valve body. The lever 53 has a narrow portion 56 that is received in the slot 32 in the piston. This portion 56 of the lever has a pin receiving hold therethrough that receives and holds in forced engagement the pin 57 therein, said pin having portions extending into and retained in sliding engagement with the hole 33 in the piston. This lever pivots against the ball retaining race 55 and allows forward and backward motion of the lever to produce reciprocal motion in the piston. The ball retaining race allows the lever to pivot on the shaft and to be moved from side to side, as shown in FIG. 1, and to impart rotating motion to the shaft.

In operation when the piston is in the closed position shown in FIG. 2, the cap member has the resilient washer member 49 held in water-tight engagement with the piston body and prevents water from being discharged around the edge thereof. The raised portion 29 on the end of the piston surrounds the central opening 50 in the resilient cap and prevents discharge of water through this opening, thereby preventing discharge of water from the piston chamber. At the same time the boss 27 of the piston overlies the hot and cold water inlet ports 52, 52 and prevents the inflow of water into the piston chamber. When the lever is pushed backward it imparts a rearward motion to the piston and it assumes the position shown in FIG. 3. This opens the discharge central opening 50 and allows the water to flow into the discharge openings 48, 48 which permit the water to flow either into the discharge port 37 or 38. As long as the spray nozzle (not shown) prevents the water from flowing through the conduit 24 the water will flow upwardly through the discharge port 38 into the conduit 41 and eventually be discharged through the nozzle 42. The volume of water may be adjusted by regulating the distance that the lever 53 is moved which controls the opening between the resilient disk 49 in the plate and the raised portion 29 on the piston. The temperature of the water is regulated by imparting sidewise motion to the lever which allows the cut-away portion 28 of the boss on the piston to overlap more of the inlet ports 52, connected to the hot water and less of the opposite port 52 connected to the cold water. The bleed holes 30, 31 in the boss equalize the pressure between the front and the back of the piston and prevent the water pressure from forcing the piston into an open position when the piston has been closed.

While the above description of the valve and its operating mechanism as used as a lever having a ball mounted on the end thereof, which ball is retained within a race attached to and rigidly held by the valve body, other methods of operating the lever and holding it in position are shown in FIGS. 10 and 11.

In this modification the lever 58 has the same connection with the piston as shown in the prior modification, that is, a pin 59 passing through the lever and held in sliding engagement with the holes 60, 60 in the end of the piston. The lower end of the lever has a notch 61 cut therein which receives and is retained in position by the bar 62 rigidly mounted on and held in position by the valve body as shown in FIGS. 10 and 11. The method of mounting this bar on the valve body is shown in FIG. 12 where the bar 62 is forced into tight fitting holes 63, 63 in the valve body and the lower end of the lever 58 is shown as the portion 64, 64 on each side of the bar 62.

An alternative method of mounting the bar is shown in FIG. 13 where the bar 62 is cut into two portions 65, 66. After these portions have been securely screwed into the valve body, as shown in FIG. 13 they are welded together. An alternative method is to cut these portions as shown in FIG. 14 and after screwing them into the valve body to weld them.

A still further alternative method is to assemble the bar portion 65 by screwing it into the valve body and then to mount the other portion 66 in the valve body and secure the two with a bolt 67.

Another modification of the operating mechanism is shown in FIGS. 16 and 17, wherein the lever 68 is pivoted to the shaft member 69, just as described above. The lever 68 above the pivot with the shaft member 69 has a flattened portion 70. This flattened portion has a groove 71 therein to form a depending portion 72 retained within the groove 71 is a rail 73 which acts as a pivot point for reciprocating motion. This combination allows a more compact valve arrangement but reverses the action of the lever, that is, when the lever handle (not shown) is pushed rearwardly the valve closes. When it is pulled forward the valve opens. This is a result of having the pivot above the piston instead of below the piston as shown in the modification illustrated in FIGS. 1 to 10.

While in the above description a sink deck faucet has been described the valve action may be used with equal facility in other type valves, such as a basin faucet.

While the best form of a preferred embodiment of the invention has been illustrated and described as required by law, it will be apparent to those skilled in the art that it may be applied to other systems of distributing liquids and that changes may be made in the form of the apparatus to suit special conditions within the scope of this invention, as set forth in the appended claim.

What is claimed is:

A proportioning and volume controlling valve comprising the combination of a valve body having a longitudinally extending cylindrical bore provided with inlet ports in opposite sides thereof and a piston mounted on the end of a shaft, rotatably and longitudinally slidably adjustable in said bore, said piston having a boss on the inner end thereof overlying said inlet ports, said boss having a portion cut away so that on rotation at least a portion of each port will be exposed, axially spaced vents through said boss, a raised circular lip on the face of said piston, and a cap closing the front of said valve body and having a raised valve seat portion mounted on the inner surface of said cap and in water-tight engagement with said valve body, an exhaust port in the center of said valve seat portion, which port is closed by said raised lip on the face of said piston when in the closed position, an exhaust chamber for mixed water communicating with said exhaust port behind said raised valve seat portion having lateral discharge ports from said discharge chamber, said operating means comprising a single lever pivoted on said shaft in the rear of said piston at the lower end of said lever, a groove within said lever between said pivot and the upper end of said lever, forming a slot therein, a bar rigidly mounted on said valve body, said bar being retained within said slot.

References Cited by the Examiner

UNITED STATES PATENTS

| 1,949,300 | 2/34 | Fitter | 137—625.17 |
| 2,565,244 | 8/51 | Laurent | 251—160 XR |
| 2,649,919 | 8/53 | Weaver et al. | 251—333 XR |
| 2,745,432 | 5/56 | Williams | 251—333 XR |

FOREIGN PATENTS 49,234  6/10  Switzerland.

M. CARY NELSON, *Primary Examiner.*

MILTON KAUFMAN, *Examiner.*